Sept. 20, 1938.  K. CORDTS  2,130,876
FUNNEL, PARTICULARLY SUCH AS IS USED IN CONJUNCTION WITH MILK FILTERS
Filed March 2, 1937
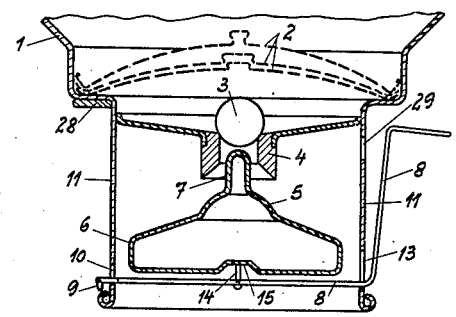
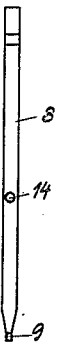
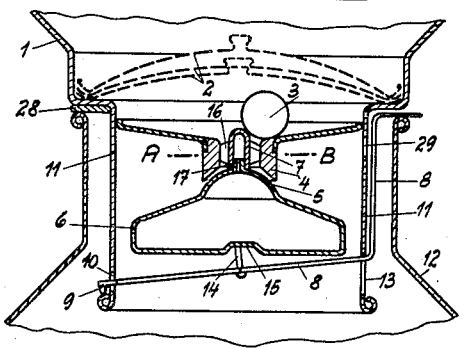
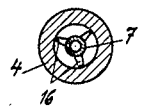
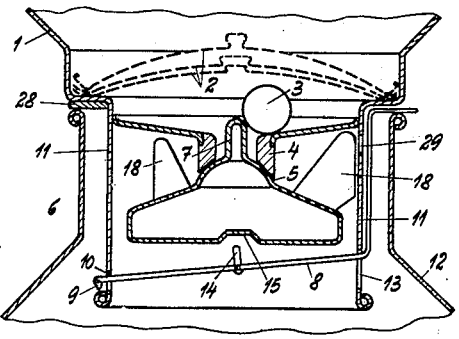
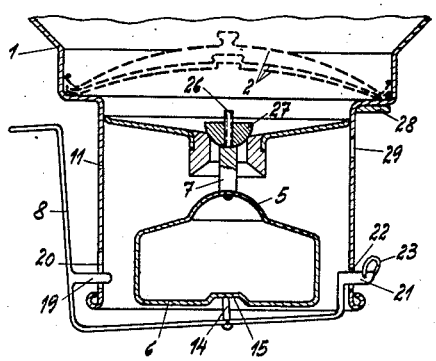
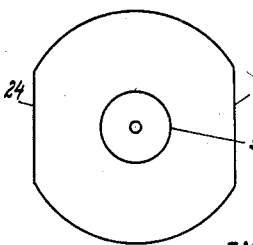
INVENTOR:
Karl Cordts
By Bryant & Lowry
Attys.

Patented Sept. 20, 1938

2,130,876

UNITED STATES PATENT OFFICE 2,130,876

FUNNEL, PARTICULARLY SUCH AS IS USED IN CONJUNCTION WITH MILK FILTERS

Karl Cordts, Eutin, Germany, assignor of one-half to Josefa Gastreich, Cologne-Meerheim, Germany Application March 2, 1937, Serial No. 128,580
In Germany July 8, 1936

7 Claims. (Cl. 226—37)

This invention relates to funnels, particularly such as are used in conjunction with milk filters, embodying automatically acting closure valve means.

Such filter funnels are required to be simple in construction, foolproof in operation, easily accessible and capable of being readily taken apart, so that they may be easily handled in practice and may comply with the rules of sanitary authorities.

The invention has for its object to improve that type of known filter funnels which embody automatically acting closure means operated by a float and a release bar.

According to the invention the float is supported by the release bar and acts upon the closure valve alone or conjointly with the release bar in such a way that when the funnel is placed upon a vessel to be filled therethrough the valve is automatically opened, it being automatically closed when the maximum filling level is reached and remaining closed when the funnel is removed from the vessel. The float is formed at its upper side with an upwardly acting closure member and with an operating member for the downwardly acting valve, the float being guided concentrically with reference to the central passage opening.

Various embodiments of the invention are illustrated by way of example on the accompanying drawing, wherein:—

Fig. 1 is a sectional view of a filter funnel, as may be used for example for introducing milk into a container through a filter arrangement mounted in the funnel, with the closure valve means in closing position, Fig. 2 is a plan view of the release bar, Fig. 3 shows a slightly modified embodiment in a view similar to Fig. 1, with the filter mounted on a container and the valve means in open position, Fig. 4 is a cross sectional view on the line A—B of Fig. 3, Fig. 5 is a view similar to Figs. 1 and 3 of a further modification, with the upwardly acting closure means in closing position, the funnel being in position on a container which has been completely filled therethrough, Fig. 6 shows a still further modification in a view similar to Fig. 1 and Fig. 7 is a plan view of the float shown in Fig. 6.

Referring to Fig. 1, the funnel 1 is fitted with filter elements 2 shown in dotted lines. The downwardly acting closure valve means comprise a ball 2 adapted to be applied to the seat member 4. The latter is also formed at its lower end with a conical seat adapted to cooperate with the closure element 5 formed on the upper side of the float 6. The latter is also provided at its peak with operating means 7 for the valve or ball 3, said operating means comprising a tubular extension of the float, or a pin or the like attached thereto. The release bar 8 is formed with a nose 9 at one end which passes through a vertical slot 10 in the neck 11 of the funnel. The other end of the release bar is cranked upwardly and the crank pin portion thereof is adapted to be seated on the upper edge of the container upon which the funnel is placed. The cranked end of the release bar 8 is guided in a slot 13 of the funnel neck 11, so that it shall have a certain amount of vertical movement. Substantially coaxially with the ball 3 and the float 6 the release bar 8 is provided with a projection comprising a pin 14 or the like, said pin co-operating with a depression 15 formed in the bottom of the float 6, the depression being of such size as to allow some lateral play for the pin, the latter preventing undue lateral movement of the float by engagement thereof with the rim portions of the depression. The release bar may be extracted laterally from the funnel neck through the slot 13 by lifting up the nose end thereof so that the nose 9 may pass through the slot 10, the float 6 being also slightly lifted for this purpose. To compensate for the thickness of the crank pin portion of the release bar when the funnel is placed on a container, suitable spacing pieces 28 are secured to the base of the funnel body 1 adjacent the upper end of the filter neck 11. Vent holes 29 are provided in the upper part of the funnel neck 11 to allow air to escape.

Fig. 2 is a plan view of the release bar 8 shown in side elevation in Fig. 1.

Referring to Fig. 3, the valve operating element 7 is provided with three wings or ribs 16 whereby it is guided axially in the seat member 4, thereby maintaining and guiding the float 6 in central position axially. The bore of the seat member may be cylindrical, but it may also be slightly tapered, being widest at its lower end. Otherwise this embodiment corresponds to that shown in Fig. 1 and like parts bear the same reference numerals.

Fig. 4 shows the guided arrangement for the float and valve operating element in cross sectional view on the line A—B of Fig. 3.

Referring to Fig. 5, the embodiment therein shown differs from those according to Figs. 1 to 4 only in that the guide means are provided on the float and comprise ribs 18 engaging the inner surface of the funnel neck 11.

Referring to Fig. 6, the release bar 8 is provided with a lateral projection 19 on its crank web part engaging a vertical slot 20 of the funnel neck 11. In this embodiment the other end of the release bar is also cranked and its terminal end 21 engages in a slot 22 of the funnel neck, pivotally co-operating therewith. The end 21 of the release bar is provided with a detachable ring 23 to prevent accidental disengagement of the bar from its guide slots 20 and 22. The float 6 is provided with opposed lateral flats 24, 25 (Fig. 7) and is formed on its upper side with an upwardly acting closure element 5, as in the previous embodiments. The operating member for the downwardly acting closure valve comprises a pin 7 fixed to the float and carrying a semi-cylindrical member 27 which constitutes the valve member. The upper end 26 of the pin 7 may project from member 27, as shown. As to the rest, this embodiment corresponds to those previously described.

In operation, when the funnel is placed upon the container 12 to be filled the release bar 8 is tilted upwardly and causes the float to rise, the valve 3 being lifted off its seat by member 7, thereby allowing the liquid poured into the funnel to pass into the container 12. When the latter is completely filled the liquid contained therein lifts the float and causes the upwardly acting closure member 5 to be applied to its seat at the lower end of member 4, whereby further access of the liquid to the container is cut off. When subsequently the funnel is lifted off the container the release bar together with the float drops, the valve operating member 7 is withdrawn and allows or causes the valve 3 to be applied to its seat.

Obviously, the funnel may be employed with or without the filter elements 2.

I claim:—

1. In a filling funnel particularly for milk filters to be placed upon milk vessels comprising a funnel body having an outlet neck, adapted to be inserted in the mouth of the vessel to be filled, a valve seat member arranged within said outlet neck and having a filling aperture, a downwardly acting gravity controlled closure valve member and an upwardly acting closure valve member in cooperative connection with said valve seat member, a float disposed within said outlet neck carrying said upwardly acting closure valve member and having means to operate said gravity controlled closure valve member, lateral recesses in said outlet neck, a displaceable release bar guided in said recesses and carrying said float being adapted to cooperate with the mouth of the vessel to be filled when the funnel is placed in operative position thereon so that when the funnel is placed in the mouth of the vessel, said float is raised and said gravity controlled closure valve member is displaced to open the filling aperture in said valve seat member.

2. In a filling funnel particularly for milk filters to be placed upon milk vessels, comprising a funnel-body having an outlet neck adapted to be inserted in the mouth of the vessel to be filled, a valve seat member arranged within said outlet neck, a filling aperture in said valve seat member, a downwardly gravity acting closure valve member and an upwardly acting closure valve member in cooperative connection with said valve seat member, a float disposed within said outlet neck, carrying said upwardly acting closure valve member and having means to operate said gravity controlled closure valve member, lateral recesses in said outlet neck, a displaceable release bar guided in said lateral recesses and extending across said outlet neck, at least one end of said release bar being in cooperative engagement with the mouth of the vessel when the funnel is placed in operative position thereon said release bar, said float and its means to operate said gravity controlled closure valve member being removed upwardly by said engagement to open the filling aperture in said valve seat member.

3. In a filling funnel particularly for milk filters to be placed upon milk vessels, comprising a funnel body, having an outlet neck, adapted to be inserted in the mouth of the vessel to be filled, a valve seat member having a filling aperture within said outlet neck, a downwardly acting closure valve member and an upwardly acting closure valve member in cooperative connection with said valve seat member, a float disposed within said outlet neck, carrying said upwardly acting closure valve member, means on said float to operate said downwardly acting closure valve member, having lateral flanges above said upwardly acting closure valve member for centrally guiding said float, lateral recesses in said outlet neck, a displaceable release bar disposed below said float and guided in said lateral recesses of the outlet neck for carrying said float, at least one end of said release bar extending outwardly of the outlet neck for engagement with the mouth of the vessel when the funnel is in operative position thereon, said release bar, said float and its means to operate said downwardly acting closure valve member, being removed by said engagement to open the filling aperture in said valve seat member.

4. In a filling funnel particularly for milk filters to be placed upon milk vessels, comprising a funnel body having an outlet neck adapted to be inserted in the mouth of the vessel to be filled, a valve seat member having a filling aperture within said outlet neck, a downwardly acting closure valve member and an upwardly acting closure valve member in cooperative connection with said valve seat member, a float disposed within said outlet neck, carrying said upwardly acting closure valve member, means on said float to operate said downwardly acting closure valve member, lateral projections at the circumference of said float for centrally guiding said float within said outlet neck, lateral recesses in said outlet neck, a displaceable release bar, disposed below said float and across said outlet neck and guided in said lateral recesses of the outlet neck for carrying said float, at least one end of said release bar extending outwardly of the outlet neck for engagement with the mouth of the vessel when the funnel is in operative position thereon, said release bar, said float and the means connected with it being removed by said engagement to open the filling aperture in said valve seat member.

5. In a filling funnel particularly for milk filters to be placed upon milk vessels comprising a funnel body, having an outlet neck, adapted to be inserted in the mouth of the vessel to be filled, a valve seat member, having a filling aperture within said outlet neck, a downwardly acting closure valve member and an upwardly acting closure valve member in cooperative connection with said valve-seat member, a float disposed within said outlet neck carrying said upwardly acting closure valve member means on said float to operate said downwardly acting closure valve member, lateral recesses in said outlet neck, a displaceable release bar disposed below said float and guided in said lateral recesses of the outlet neck, a cooperating pin and recess engagement as a centrally acting guide means between said float and said release bar, at least one end of said release bar extending outwardly of said outlet neck for engagement with the mouth of the vessel when the funnel is in operative position thereon, said release bar, said float and the means connected with it being removed by said engagement to open the filling aperture in said valve seat member.

6. In a filling funnel particularly for milk filters to be placed upon milk vessels comprising a funnel body having an outlet neck adapted to be inserted in the mouth of the vessel to be filled, a valve seat member having a filling aperture within said outlet neck, a downwardly acting closure valve member and an upwardly acting closure valve member in cooperative connection with said valve seat member, means for detachable connection between said two valve members and centrally guiding said valve members with respect to said valve seating, a float disposed below said valve members and carrying same and its connecting means, lateral recesses in said outlet neck, a displaceable release bar disposed below said float and guided in said lateral recesses, at least one end of said release bar extending outwardly of the outlet neck for engagement with the mouth of the vessel when the funnel is in operative position thereon, said release bar, said float and all parts in fixed connection with it, being removed by said engagement to open the filling aperture in said valve seat member.

7. In a filling funnel particularly for milk filters to be placed upon milk vessels, comprising a funnel body, having an outlet neck to be inserted in the mouth of the vessel to be filled, a valve seat member, having a filling aperture within said outlet neck, a downwardly acting closure valve member and an upwardly acting closure valve member, the acting surface of each of said closure valve members being spherical shaped and cooperating with said valve seat member, a float disposed within said outlet neck carrying said upwardly acting closure valve member and having means to operate said downwardly acting closure valve member, lateral recesses in said outlet neck, a displaceable release bar guided in said lateral recesses and extending across said outlet neck, at least one end of said release bar being in cooperative engagement with the mouth of the vessel when the funnel is placed in operative position thereon, said release bar, said float and all means in fixed connection with or influenced by the float being removed upwardly by said engagement to open the filling aperture in said valve seating.

KARL CORDTS.